(12) United States Patent
Chatani

(10) Patent No.: US 7,228,342 B2
(45) Date of Patent: Jun. 5, 2007

(54) SYSTEM FOR UTILIZING AN INCENTIVE POINT SYSTEM BASED ON DISC AND USER IDENTIFICATION

(75) Inventor: Masayuki Chatani, Sunnyvale, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 815 days.

(21) Appl. No.: 09/894,182

(22) Filed: Jun. 28, 2001

(65) Prior Publication Data

US 2002/0116206 A1 Aug. 22, 2002

Related U.S. Application Data

(60) Provisional application No. 60/270,235, filed on Feb. 20, 2001.

(51) Int. Cl.
G06F 15/16 (2006.01)

(52) U.S. Cl. .................. 709/219; 709/203; 709/217; 709/223; 713/201

(58) Field of Classification Search ............... 709/203, 709/219, 224, 225, 229, 232, 217, 223; 705/26, 705/36; 713/201
See application file for complete search history.

(56) References Cited

U.S. PATENT DOCUMENTS

| | | | |
|---|---|---|---|
| 5,222,134 A | 6/1993 | Waite et al. | |
| 5,233,423 A | 8/1993 | Jernigan et al. | |
| 5,490,216 A | 2/1996 | Richardson, III | |
| 5,523,551 A | 6/1996 | Scott | |
| 5,532,735 A | 7/1996 | Blahut et al. | |
| 5,636,277 A | 6/1997 | Nagahama | |
| 5,794,217 A | 8/1998 | Allen | |
| 5,809,145 A | 9/1998 | Slik et al. | |
| 5,838,314 A | 11/1998 | Neel et al. | |
| 5,892,900 A | 4/1999 | Ginter et al. | |
| 5,913,040 A | 6/1999 | Rakavy et al. | |
| 6,066,182 A * | 5/2000 | Wilde et al. ................. | 717/175 |
| 6,070,141 A | 5/2000 | Houvener et al. | |
| 6,073,123 A | 6/2000 | Staley | |
| 6,081,785 A | 6/2000 | Oshima et al. | |
| 6,085,262 A | 7/2000 | Sawada | |
| 6,117,011 A | 9/2000 | Lvov | |
| 6,119,108 A | 9/2000 | Holmes et al. | |

(Continued)

FOREIGN PATENT DOCUMENTS

EP 0 773 490 A1 5/1997

(Continued)

Primary Examiner—David Y. Eng
Assistant Examiner—Liang-che Alex Wang
(74) Attorney, Agent, or Firm—Carr & Ferrell LLP

(57) ABSTRACT

A system and method for awarding incentive points utilizing unique disc identification to provide access to disc storage media includes a disc storage medium with a permanently recorded disc identification, a user console with a set identification, a network, and a host server managing a user database and a disc database. Upon purchase of software stored on a disc storage medium, the unique disc identification and user identification are transmitted over the network from the user console to the host server. Permission to access the programs residing on the disc storage medium by the user console is obtained from the host server. The host server manages a point system. Points are awarded and recorded in point accounts stored in the databases.

22 Claims, 6 Drawing Sheets

U.S. PATENT DOCUMENTS

| | | |
|---|---|---|
| 6,135,646 A | 10/2000 | Kahn et al. |
| 6,137,480 A | 10/2000 | Shitani |
| 6,148,335 A * | 11/2000 | Haggard et al. ............ 709/224 |
| 6,189,146 B1 | 2/2001 | Misra et al. |
| 6,195,432 B1 | 2/2001 | Takahashi et al. |
| 6,201,771 B1 * | 3/2001 | Otsuka et al. ........... 369/30.32 |
| 6,243,796 B1 | 6/2001 | Otsuka |
| 6,247,131 B1 | 6/2001 | Kotani et al. |
| 6,260,141 B1 | 7/2001 | Park |
| 6,311,209 B1 | 10/2001 | Olson et al. |
| 6,314,451 B1 | 11/2001 | Landsman et al. |
| 6,405,203 B1 | 6/2002 | Collart |
| 6,434,535 B1 | 8/2002 | Kupka et al. |
| 6,446,260 B1 * | 9/2002 | Wilde et al. ................ 717/173 |
| 6,463,078 B1 * | 10/2002 | Engstrom et al. ........... 370/466 |
| 6,470,085 B1 * | 10/2002 | Uranaka et al. ............ 380/231 |
| 6,529,453 B1 * | 3/2003 | Otsuka et al. ........... 369/30.32 |
| 6,560,640 B2 * | 5/2003 | Smethers .................... 709/219 |
| 6,594,740 B1 * | 7/2003 | Fukuda ....................... 711/156 |
| 6,611,607 B1 * | 8/2003 | Davis et al. ................ 382/100 |
| 6,640,306 B1 | 10/2003 | Tone et al. |
| 6,694,025 B1 | 2/2004 | Epstein et al. |
| 6,832,318 B1 * | 12/2004 | Yaegashi et al. ............ 713/193 |
| 6,920,565 B2 | 7/2005 | Isaacson et al. |
| 2001/0020295 A1 | 9/2001 | Satoh |
| 2001/0025256 A1 * | 9/2001 | Oliphant et al. .............. 705/26 |
| 2001/0034721 A1 * | 10/2001 | Boudreau et al. ............ 705/72 |
| 2001/0042021 A1 * | 11/2001 | Matsuo et al. ................ 705/26 |
| 2001/0051996 A1 | 12/2001 | Cooper et al. |
| 2002/0016922 A1 | 2/2002 | Richards et al. |
| 2002/0052816 A1 * | 5/2002 | Clenaghan et al. ........... 705/36 |
| 2002/0077988 A1 | 6/2002 | Sasaki et al. |
| 2002/0082997 A1 | 6/2002 | Kobata et al. |
| 2002/0103855 A1 * | 8/2002 | Chatani ...................... 709/203 |
| 2002/0104019 A1 * | 8/2002 | Chatani et al. ............. 713/201 |
| 2002/0116283 A1 | 8/2002 | Chatani |
| 2002/0129094 A1 * | 9/2002 | Reisman ..................... 709/203 |
| 2002/0161709 A1 | 10/2002 | Floyd et al. |
| 2003/0032486 A1 | 2/2003 | Elliott et al. |

FOREIGN PATENT DOCUMENTS

| | | |
|---|---|---|
| EP | 0 795 809 | 9/1997 |
| EP | 1 016 960 A1 | 7/2000 |
| JP | 9-244886 | 9/1997 |
| JP | 10-069511 | 3/1998 |
| JP | 10-133955 | 5/1998 |
| JP | 10-222428 | 8/1998 |
| JP | 11-143719 | 5/1999 |
| JP | 2000-020795 | 1/2000 |
| JP | 2000-227919 | 8/2000 |
| JP | 2000-298689 | 10/2000 |
| JP | 02001169246 | 6/2001 |
| KR | 1998-030143 | 7/1998 |
| KR | 1998-033266 | 7/1998 |
| KR | 2000-0060715 | 10/2000 |
| WO | WO 00/63860 | 10/2000 |
| WO | WO 02/001333 A3 | 1/2002 |

* cited by examiner

Disc Storage Medium

SYSTEM FOR UTILIZING AN INCENTIVE POINT SYSTEM BASED ON DISC AND USER IDENTIFICATION

CROSS REFERENCE TO RELATED APPLICATIONS

This application is related to, and claims the benefit of, U.S. Provisional Patent Application No. 60/270,235, entitled "Apparatus and Method for Utilizing an Incentive Point System Based on Disc and User Identification," filed Feb. 20, 2001 and hereby incorporated by reference. This application is also related to U.S. patent application Ser. No. 09/894,793 entitled "System and Method for Transfer of Disc Ownership Based on Disc and User Identification," filed Jun. 28, 2001 the subject matter of which is hereby incorporated by reference. The related applications are commonly assigned.

BACKGROUND OF THE INVENTION

1. Field of the Invention

This invention relates generally to electronic processing systems and more particularly to a point reward system utilizing unique disc identification to authorize access to disc storage media.

2. Description of the Background Art

Disc storage media, such as CD-ROM and DVD-ROM storage discs, are typical storage devices for commercially available software programs. For example, publishers and manufacturers of games for electronic gaming systems use read-only storage devices such as CD-ROM discs to distribute and sell their products. Discs may be passed and shared among users; however, there is no effective system in place to account for the potential multiple users of commercially available software products.

Even though discs may be shared without any constraints, it may be that discs are shared only between small groups of users without widespread distribution among the entire user population. The software product is not widely shared, thereby forcing others to purchase their own copy. The software product does not achieve widespread advertising either, limiting the potential for a larger consumer base. For example, the publishers and distributors of game software would like their products advertised to a wide customer base as well as purchased by a wide customer base.

A system that would offer an incentive to a user of a software product when this user shares the product with others, or when the user plays the product, is a concern of publishers and distributors of software products. A user may tire of a product on a disc, but instead of storing the disc away, maybe never to be seen again, the user is offered an incentive to share. Therefore, the user may be more inclined to share a software product with others. Such a system would (1) promote the product, (2) attract other users who may purchase more products in the future, and (3) offer all users incentives to purchase more products.

SUMMARY OF THE INVENTION

An electronic processing system includes a disc storage medium with a permanently recorded disc identification, a user console with a set identification, a network, a host server managing a user database and a disc database, and multiple publisher servers managing multiple publisher databases. The user console may include a memory card or other removable storage medium, for storing data including the set identification and disc identification. Upon the first use of the console, the user is prompted for user information from the host server, and a user identification is assigned to the user. The user identification is functionally interchangeable with the set identification, and either may be used to identify the user.

The user database includes a plurality of user tables, each user table including a user identification associated with a point account. The point account includes data relevant to the management of an incentive point system including the total points accumulated by the user identified with the associated user identification. The disc database includes a plurality of disc tables, each disc table including a disc identification with an associated owner consent data field and a sub-account. The owner consent data field includes data regarding other user access permissions. The sub-account includes data relevant to the management of an incentive point system including the points accumulated by the user identified with the associated disc identification. In addition, each publisher database includes a plurality of sub-accounts, where each sub-account is similar in content to the sub-account of the disc table. Instead of managing the sub-accounts by the host server, the sub-accounts may be managed by the publisher servers.

In one embodiment, the user console connects to the host server and transmits the user identification and disc identification read from the disc storage medium to gain permission to execute the programs residing on the disc storage medium. In another embodiment, the user console connects to the host server and transmits the user identification and disc identification the first time a disc is booted by the user console, but after the initial access permission is granted, the disc identification and user identification are stored on the memory card to grant access permission for subsequent disc sessions.

The host server compares the transmitted disc identification with the stored disc identifications associated with the transmitted user identification in the user table, and if necessary, with the stored disc identifications associated with the other user identifications. The host server awards incentive points to (1) the sub-account of a user of a first-time registered disc, (2) the sub-account of a previous user of a disc that has granted another user access permission, and (3) the sub-account of a user of a disc used previously by the same user.

DETAILED DESCRIPTION OF THE PREFERRED EMBODIMENT

Figure 1:
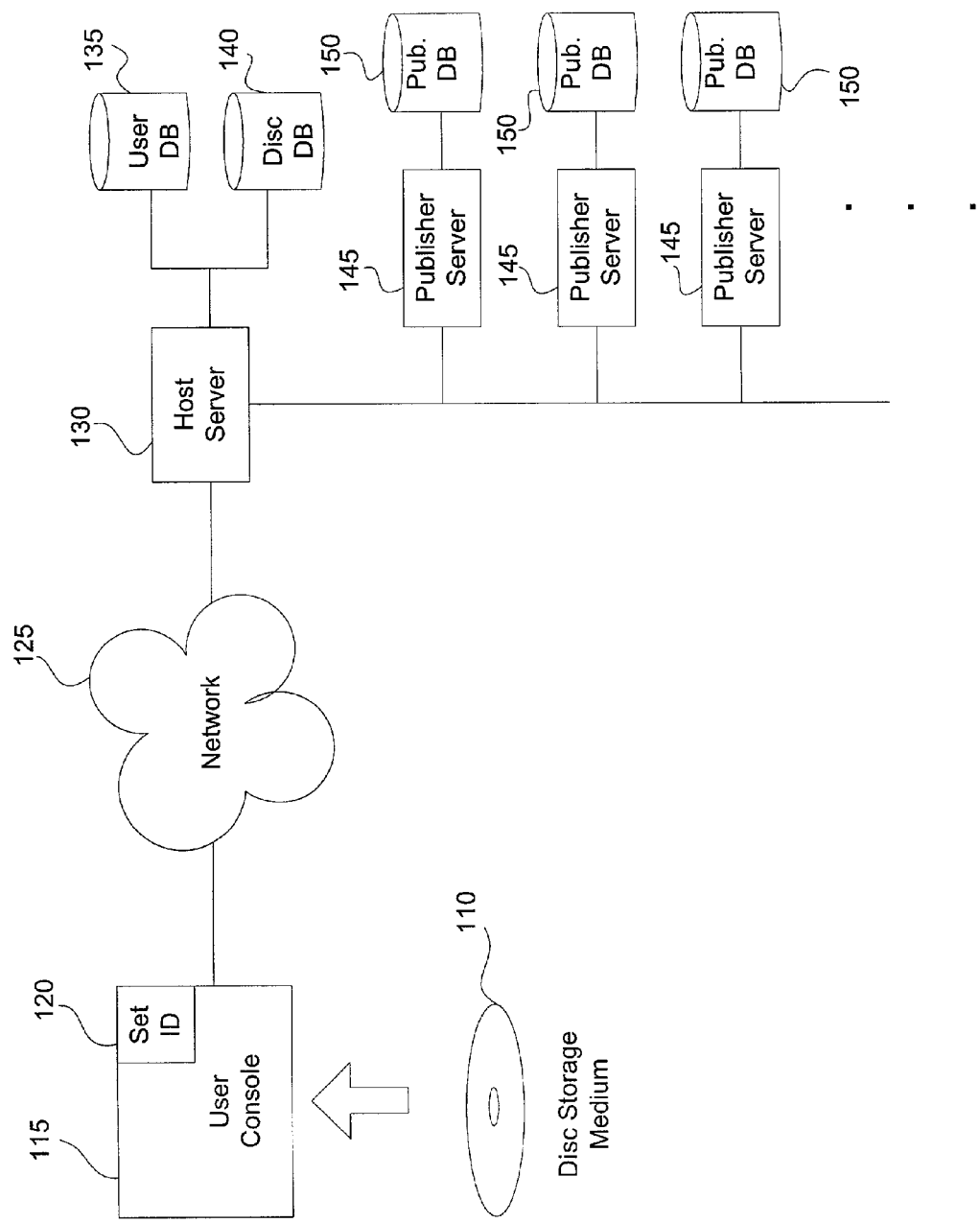
FIG. 1 is a block diagram of one embodiment of an electronic processing system according to the invention.

FIG. 1 is a block diagram of one embodiment of an electronic processing system according to the invention. The processing system includes, but is not limited to, a disc storage medium (disc) 110, a user console 115, a set identification (ID) 120, a network 125, a host server 130, a user database (DB) 135, a disc database (DB) 140, a plurality of publisher servers 145, and a plurality of publisher databases (Pub. DB) 150.

The disc 110 is a read-only storage device such as a CD-ROM or a DVD-ROM. As will be discussed further below in conjunction with FIG. 2, a disc identification is stored on the disc 110 to uniquely identify the disc 110.

The user console 115 is an electronic device, such as an electronic gaming system, a general-purpose computer, or a set-top box, that may access the contents of the disc 110. The user console 115 has an interface to the network 125. The network 125 may be a local area network (LAN), a wide area network (WAN), a wireless network, a cable network, or the Internet. The Internet is a broad network of interconnected computers and servers allowing for the transmission and exchange of Internet Protocol (IP) data between users connected to the Internet through a network service provider. Examples of network service providers are the public switched telephone network, a cable service provider, or a satellite service provider.

The user console 115 may be configured to access data from other removable storage media, such as memory cards, floppy discs, or hard disc drives.

During a first use of the user console 115, a user registers the user console 115 with the host server 130. The user console 115 may be registered and identified by either a set ID 120 or a USER ID. The host server 130 stores the set ID 120, the USER ID, or both in the user database 135. As further discussed below in conjunction with FIG. 6, the first time user of the user console 115 will be prompted by the host server 130 to enter user information. This user information will be used to associate a USER ID with a user. In the preferred embodiment of the invention, the USER ID identifies users. However, the set ID 120 may be used instead of the USER ID to identify users.

The host server 130 stores data in the user database 135 and the disc database 140. The databases will be discussed in more detail below in conjunction with FIGS. 3A–3B. In the preferred embodiment of the invention, the host server 130 has access to a plurality of publisher servers 145. The publisher servers 145 manage sub-accounts associated with DISC UNIQUE IDs and stored in a plurality of publisher databases 150. The publisher databases 150 will be discussed below in conjunction with FIG. 4.

Figure 2:
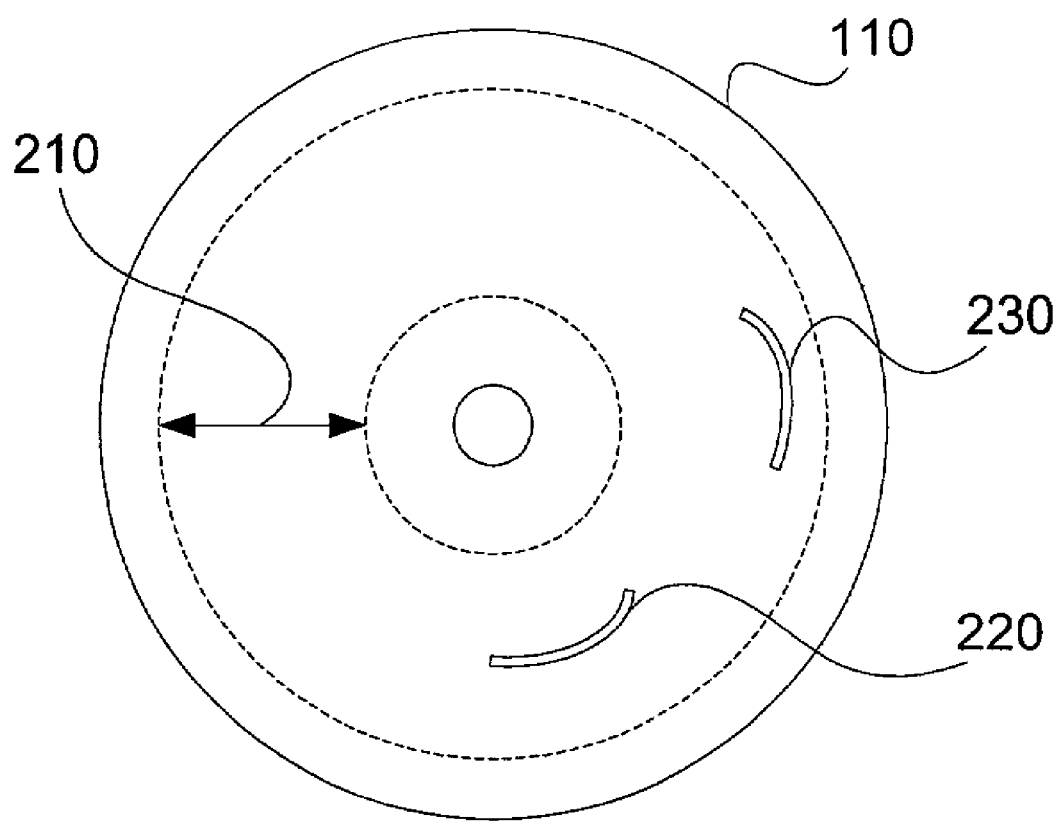
FIG. 2 is a diagram of one embodiment of the disc storage medium of FIG. 1 according to the invention.

FIG. 2 is a diagram of one embodiment of the disc 110 according to the invention. The disc 110 includes, but is not limited to, a data access area 210, a DISC UNIQUE ID address 220, and a DISC UNIQUE ID 230. The disc 110 has a data access area 210 delineated by an inner and outer radius. Data is typically recorded within the data access area 210. The data may include software programs, video data, audio data, or any other type of stored content. Although FIG. 2 shows the DISC UNIQUE ID address 220 and the DISC UNIQUE ID 230 recorded within the data access area 210, either can be recorded outside of the data access area 210.

The DISC UNIQUE ID address 220 contains the disc address of the DISC UNIQUE ID 230. The DISC UNIQUE ID 230 uniquely identifies the disc 110. The contents of the disc 110 cannot be played on the user console 115 or other devices without access permission for the disc 110. Access instructions are sent to the user console 115 from the host server 130 upon receipt of the DISC UNIQUE ID 230 and the USER ID by the host server 130 from the user console 115. Access permission and incentive/reward point transactions will be discussed below in conjunction with FIGS. 5–6.

Figure 3:
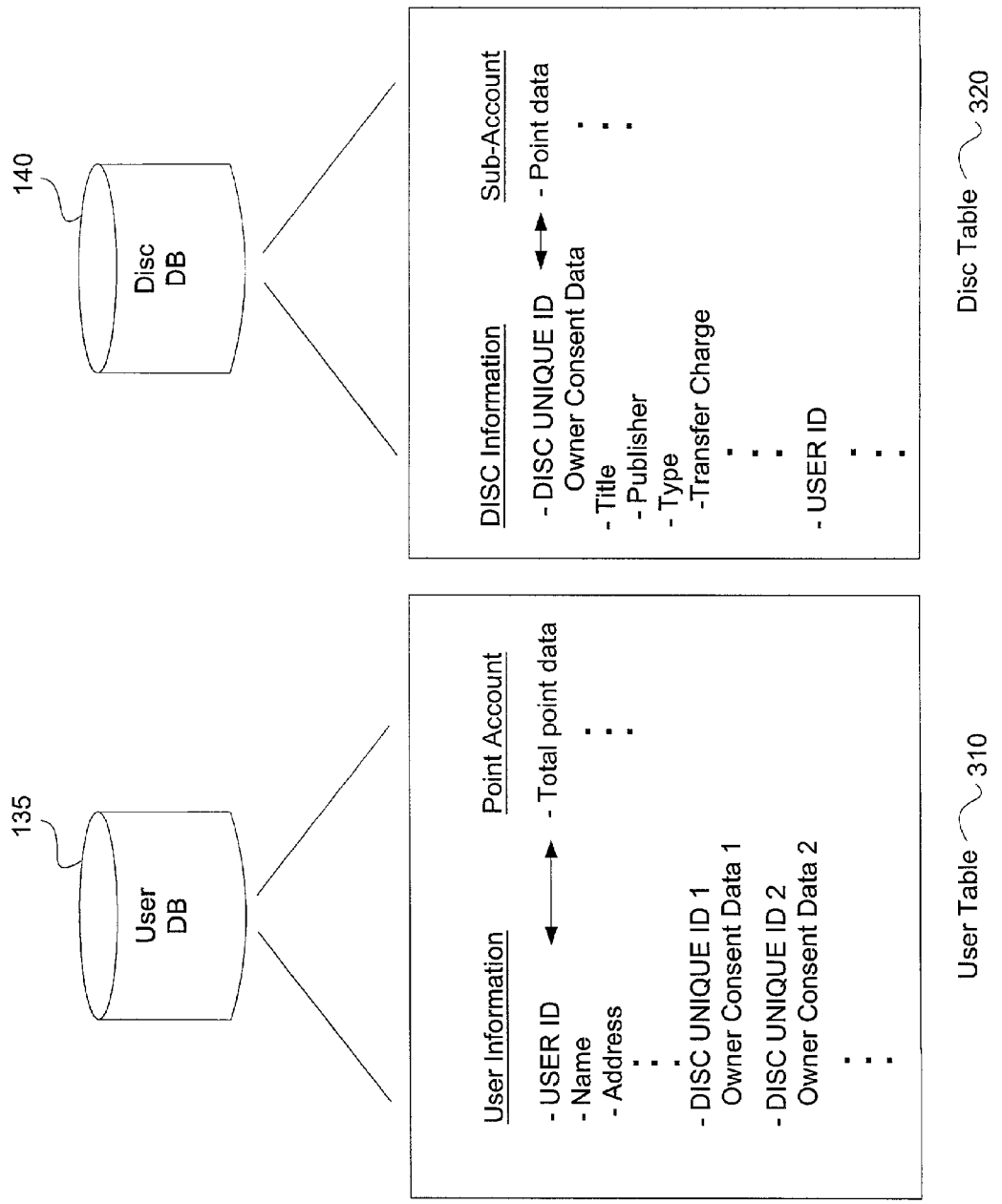
FIG. 3A shows one embodiment of the user database managed by the host server of FIG. 1 according to the invention.
FIG. 3B shows one embodiment of the disc database managed by the host server of FIG. 1 according to the invention.

FIG. 3A shows one embodiment of the user database 135 of FIG. 1 according to the invention. The user database 135 has a user table 310, including user information and point account information. User information includes the USER ID and may also include, for example, user name, address, billing information, and user preferences. The point account information includes incentive and reward point information, such as the total point count and other data relevant to the management of the incentive and reward point system. The user table 310 may also include a plurality of DISC UNIQUE IDs that are associated with each USER ID. Each DISC UNIQUE ID has associated owner consent data. The owner consent data is a data field that contains information regarding the transfer of access permission to another user.

FIG. 3B shows one embodiment of the disc database 140 of FIG. 1 according to the invention. The disc database 140 has a disc table 320 including disc information and sub-account information. The disc information includes the DISC UNIQUE ID accompanied by owner consent data and may also include, for example, title, publisher, type, date of purchase, and transfer charge. The disc table 320 may also contain a USER ID associated with each DISC UNIQUE ID. The transfer charge data field includes the payment amount due the user upon transfer of ownership to another user. The transfer charge data field may include other data relevant to charges incurred when ownership of a disc is transferred. The disc table 320 includes a sub-account associated with each DISC UNIQUE ID. The host server 130 manages the sub-accounts. The sub-account includes incentive and reward point information for each DISC UNIQUE ID, such as point count or other data relevant to the management of the incentive and reward point system.

Figure 4:
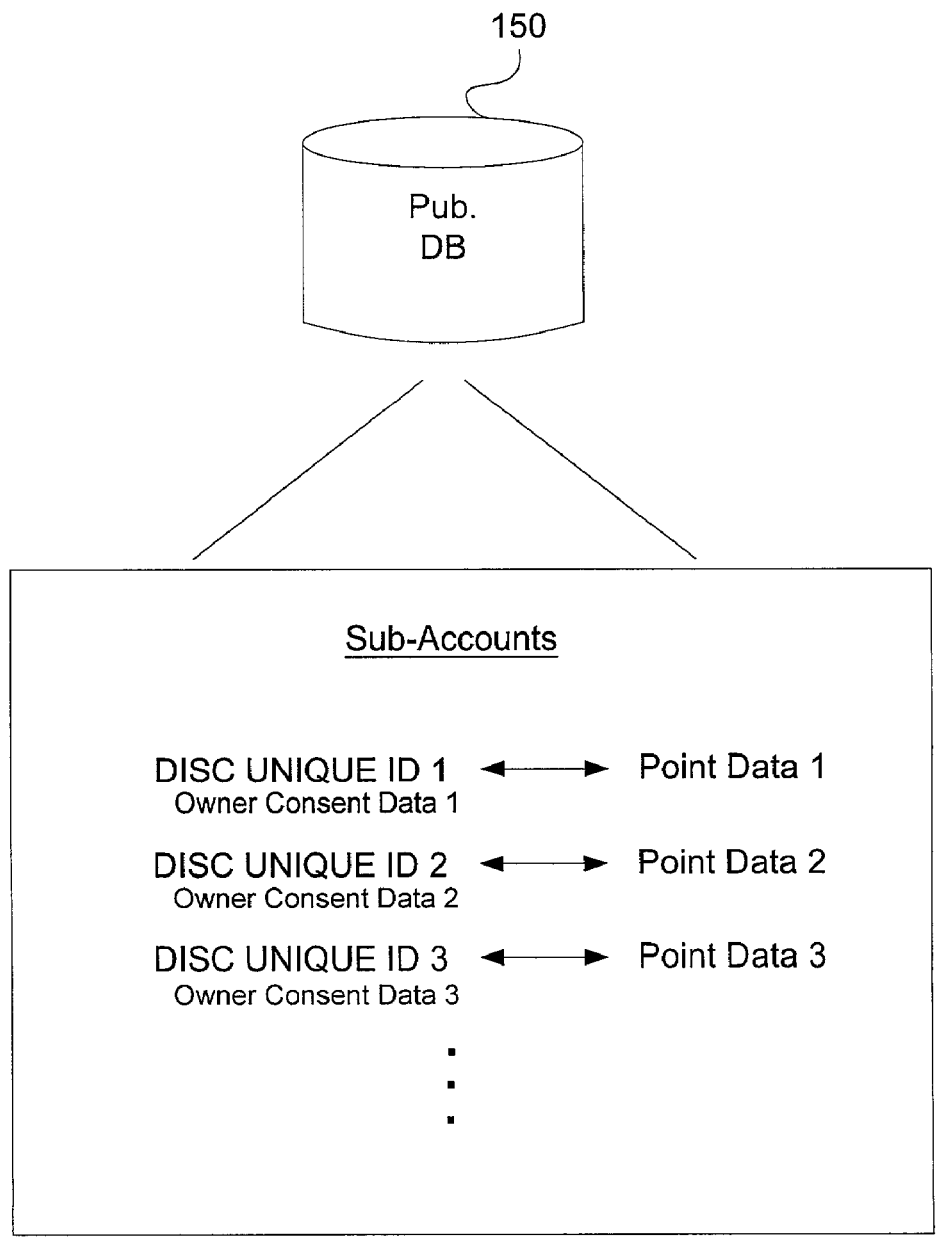
FIG. 4 shows one embodiment of the publisher database managed by the publisher server of FIG. 1 according to the invention.

FIG. 4 shows one embodiment of the publisher database 150 of FIG. 1 according to the invention. In addition to the host server 130 managing the sub-accounts stored in the disc database 140, the publisher server 145 may manage sub-accounts that are subsequently stored in the publisher database 150. The sub-accounts of the publisher database 150 include incentive and reward point information for each DISC UNIQUE ID, such as point count or other data relevant to the management of the incentive and reward point system. For example, sub-accounts of the publisher database 150 may include a plurality of DISC UNIQUE IDs with related reward and incentive point data for all discs manufactured by the publisher and registered by users. A user may have multiple sub-accounts with each publisher. The user may transfer points from the main point account of the user database 135 to any of the sub-accounts stored on the plurality of publisher databases 150 or the sub-account stored on the disc database 140.

Figure 5:
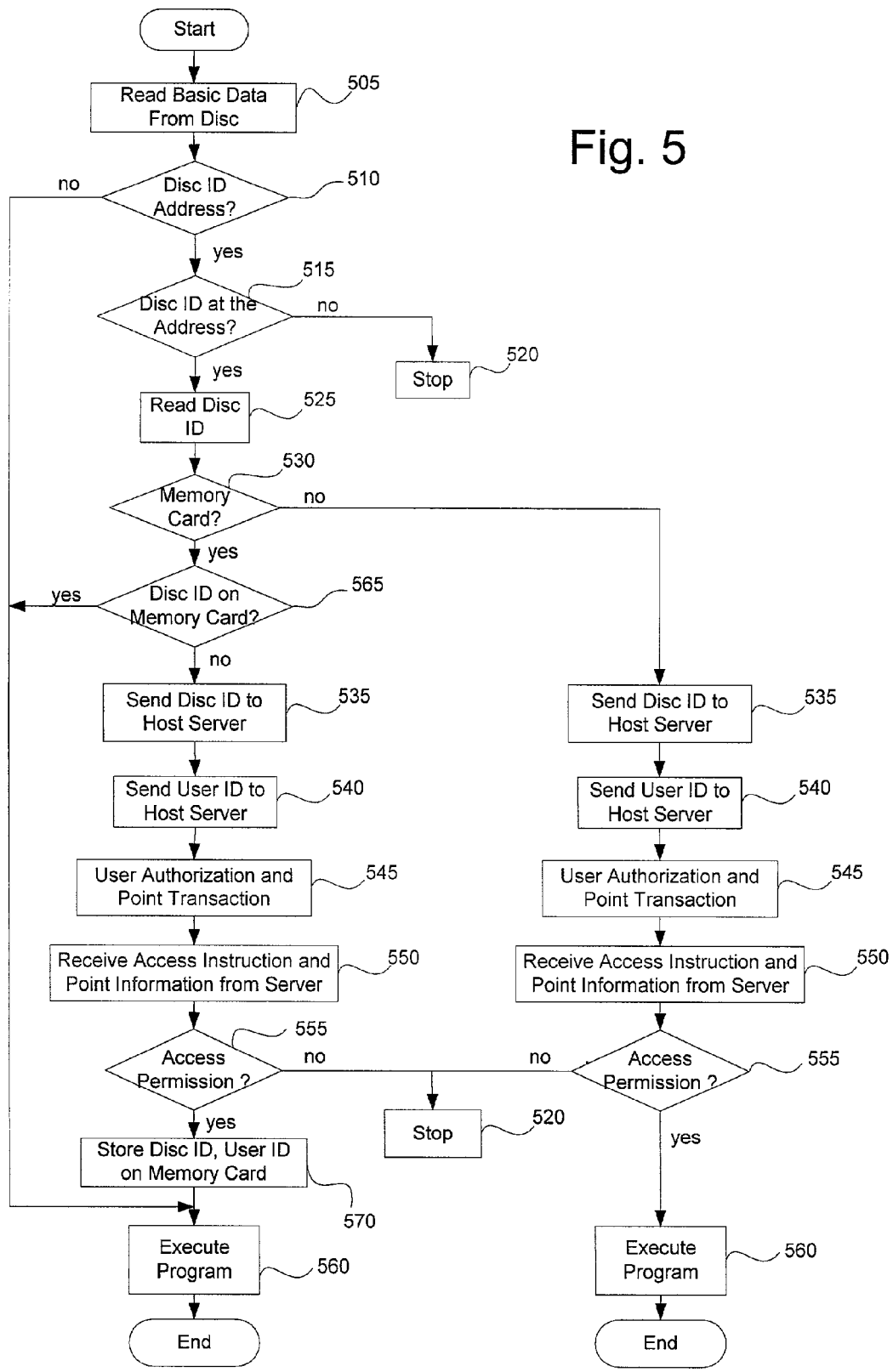
FIG. 5 is a flowchart of method steps for acquiring disc access permission according to one embodiment of the invention.

FIG. 5 is a flowchart of method steps for a user to acquire access permission for a disc 110 on the user console 115, according to one embodiment of the invention. First, in step 505, the user console 115 reads basic data from the disc 110. In step 510 the user console 115 determines if a DISC UNIQUE ID address 220 is stored on the disc 110. If the DISC UNIQUE ID address 220 does not exist, then the method continues with step 560, and the disc program is executed. However, if a DISC UNIQUE ID address 220 does exist, then, in step 515, the user console 115 determines whether a DISC UNIQUE ID 230 is stored at the location given by the DISC UNIQUE ID address 220. If there is no DISC UNIQUE ID 230 recorded, then disc program execution is stopped in step 520. If there is a DISC UNIQUE ID 230 recorded, then, in step 525, the DISC UNIQUE ID 230 is read by the user console 115. In step 530, the user console 115 determines if a memory card is present. The memory card is a removable storage device compatible with the user console 115 or other user consoles that may store data such as USER ID and DISC UNIQUE ID 230.

The FIG. 5 embodiment shows two paths to gain access permission to the disc 110. If a memory card is not present in user console 115, then the DISC UNIQUE ID 230 and USER ID will be sent to the host server 130 every time the disc 110 is booted. If a memory card is present, then the DISC UNIQUE ID 230 and USER ID is only sent to the host server 130 the first time a user boots the disc 110. When the same user boots the disc 110 on subsequent occasions, host server 130 access is not needed to access the disc 110. Instead of sending the USER ID and DISC UNIQUE ID 230 to the host server 130 for access confirmation, the USER ID and DISC UNIQUE ID 230 stored on the memory card are used to confirm or deny access to the disc 110.

In step 530, if the user console 115 determines that a memory card is not present, then, in step 535, the user console 115 sends the DISC UNIQUE ID 230 to the host server 130. In step 540, the USER ID is sent to the host server 130. In step 545, access instructions regarding user authorization are generated and, if appropriate, an incentive point or reward point transaction is made and recorded in the point account and sub-account data fields in the user database 135, disc database 140, and publisher database 150. Moreover, if necessary, disc ownership or changes in disc ownership is recorded in the appropriate data fields in the user database 135, disc database 140, and publisher database 150. The details of step 545 will be discussed in more detail in conjunction with FIG. 6.

In step 550, the user console 115 receives from the host server 130 the access instructions, and in addition, point information for any incentive point or reward point transactions conducted. If access permission is granted, step 555, then disc program execution can commence in step 560. However, if access permission is not granted, disc program execution is stopped in step 520. The details regarding access permission and access denial will be discussed below in conjunction with FIG. 6.

Returning to step 530, if the user console 115 determines that a memory card is present, then, in step 565, the user console 115 determines whether the DISC UNIQUE ID 230 is recorded on the memory card. If the DISC UNIQUE ID 230 is stored on the memory card, then the host server 130 is not contacted and the disc program can be executed in step 560. However, if the user console 115 determines that the DISC UNIQUE ID 230 is not stored on the memory card, then in step 535 the user console 115 sends the DISC UNIQUE ID 230 to the host server 130. In step 540, the user console 115 sends the USER ID to the host server 130. In step 545, the host server 130 generates user authorization and point transaction data. In step 550, the user console 115 receives access instructions and point information from the host server 130. In step 555, if disc access permission is granted, the DISC UNIQUE ID 230 and USER ID are stored on the memory card in step 570 and then the disc program is executed in step 560. Consequently, the next time the user boots up the disc 110 with the same memory card installed, the host server 130 does not need to be contacted for access permission.

Figure 6:
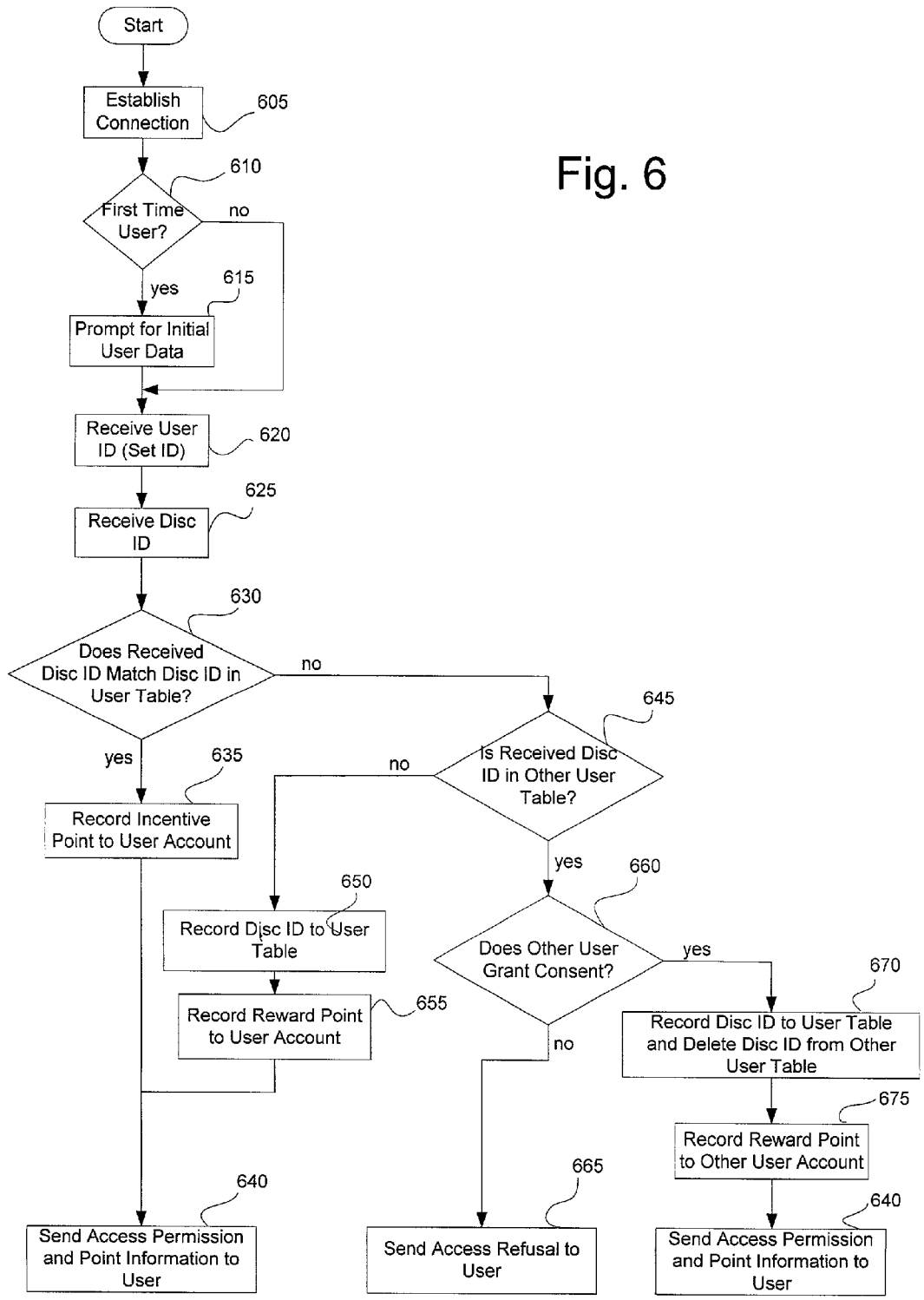
FIG. 6 is a flowchart of method steps for granting disc access permission and awarding reward/incentive points according to one embodiment of the invention.

FIG. 6 is a flowchart of method steps for granting disc access permission and awarding reward/incentive points according to one embodiment of the invention. First, in step 605, a network connection is established from the user console 115 to the host server 130. Then, in step 610, the host server 130 determines whether the user is a first time user. If the user is a first time user, then, in step 615, the host server 130 prompts the user for initial user data. The user is then assigned a USER ID by host server 130. If the user is not a first time user, then step 615 is skipped. In steps 620 and 625 the host server 130 receives the USER ID (or set ID) and DISC UNIQUE ID 230 from the user console 115, respectively.

In step 630, the host server 130 accesses the user database 135 associated with the USER ID and determines if the received DISC UNIQUE ID 230 matches any of the DISC UNIQUE IDs in the user table 310. If there is a match, then the disc 110 has been previously played by the user. Subsequently, in step 635, incentive point information can be recorded by the host server 130 to the user's point accounts or sub-accounts in any of the databases 135, 140, and 150. Finally, in step 640, access permission and incentive point information is sent to the user console 115.

Users can be awarded incentive points for playing a disc 110. Incentive point schemes may be developed and implemented by the host server 130 or publisher servers 145, and may depend, for example, on disc publication date, disc popularity, special promotional schemes, or user performance. In addition, as discussed further below, users can be awarded reward points for either purchase of a new disc or transfer of disc ownership to another user. The reward point system provides users incentives to purchase new discs or sell used discs to other users, thereby promoting a disc to a wider audience and developing a larger customer base. Reward points and incentive points are recorded by the host server 130 and publisher servers 145 to the user's point accounts and sub-accounts. Points have value, and may, for example, be redeemed for rebates on disc purchases, publisher promotional items, updated versions of discs or user consoles, or may be traded among users. The foregoing examples of point redemption are not inclusive, however, and points may be redeemed for other items as well.

If the received DISC UNIQUE ID 230 does not match any of the DISC UNIQUE IDs in the user table 310 in step 630, then in step 645 the host server 130 searches for the received DISC UNIQUE ID 230 in other user's user tables. If the host server 130 does not locate a match, then the disc 110 associated with the received DISC UNIQUE ID 230 has been purchased new by the user and never played. Therefore, in step 650, the DISC UNIQUE ID 230 is recorded to the user table 310. The DISC UNIQUE ID 230 may also be recorded in the disc table 320 in the disc database 140 or the publisher database 150. The user may be granted reward points for purchase of the new disc. Reward points granted are recorded to the user point account or sub-accounts in the multiple databases 135, 140, and 150 in step 655. Finally, in step 640, the host server 130 sends access permission and point information to the user console 115.

If, in step 645, the host server 130 does match the received DISC UNIQUE ID 230 to a DISC UNIQUE ID in another user's user table, then another user owns the disc 110. Therefore, in step 660, the host server 130 searches the databases of the other user for owner consent data. If the other user has not granted access permission, then the user is denied access in step 665. However, if the other user has granted access permission, then, in step 670, the host server 130 deletes the DISC UNIQUE ID in the other user's user table and records the received DISC UNIQUE ID 230 to the user's user table 310. The other user may store the content of the disc 110 to a hard disc drive before granting access permission. In step 675, the host server 130 then records reward points to the other user's point account or sub-accounts stored in the multiple databases. Finally, in step 640, the host server 130 sends the user console 115 access permission and point information.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for assigning reward points, comprising:
    a user console coupled to a network, wherein the user console is configured to transmit a set identification over the network, the set identification uniquely identifying a user of the console;
    a disc storage medium including a permanently recorded disc identification unique to and identifying the disc storage medium, the disc storage medium being readable by the user console, wherein the user console is further configured to transmit the disc identification over the network; and
    a host server coupled to the network, wherein the host server is configured to:
        receive the disc identification;
        receive the set identification;
        authorize the user of the user console as identified by the set identification to execute software residing on the disc storage medium; and
        assign points to a point account associated with the disc identification, wherein the points assigned to the point account are a reward for the disc storage medium having been shared with other users.

2. The system of claim 1, further comprising a user database accessible by the host server, the user database including a user table, the user table comprising:
    user identification information; and
    a point account, wherein the point account is associated with the user identification.

3. The system of claim 2, wherein the host server is further configured to:
    compare the received disc identification with disc identification information stored in the user table and associated with the user identification information; and
    compare the received disc identification with disc identification information stored in other user tables and associated with other user identifications.

4. The system of claim 3, wherein the host server is further configured to:
    assign points to the point account in the user table and associated with the user identification; and
    transmit point information including total reward point information to the user console, if the received disc identification matches any of the disc identification information stored in the user table and associated with the user identification.

5. The system of claim 3, wherein the host server is further configured to:
    assign points to a point account in the other user table and associated with the other user identification; and
    transmit point information including total reward point information to the user console, if the received disc identification matches any of the disc identification information stored in the other user tables and associated with other user identifications, and if the matched other user table indicates owner consent.

6. The system of claim 5, wherein the host server further assigns points to the point account in the user table associated with the user identification.

7. The system of claim 3, wherein the host server is further configured to:
    assign points to the point account in the user table associated with the set identification that uniquely identifies the user of the user console; and
    transmit point information including total reward point information to the user console, if the received disc identification does not match any of the disc identification information stored in any user table.

8. The system of claim 7, wherein the host server records the received disc identification to the user table associated with the set identification that uniquely identifies the user or the user console.

9. The system of claim 3, further comprising a disc database accessible by the host server, the disc database including a disc table, the disc table comprising:
    owner consent data, the owner consent data including access permission data for other users; and
    a sub-account associated with the disc identification, the sub-account including point data associated with the disc identification.

10. The system of claim 9, wherein the host server is further configured to:
    assign points to the sub-account in the disc table and associated with the disc identification; and
    transmit point information including total reward point information to the user console, if the received disc identification matches any of the disc identification information stored in the user table associated with the user identification.

11. The system of claim 9, wherein the host server is further configured to:
    assign points to the sub-account in the disc table and associated with the disc identification; and
    transmit point information including total reward point information to the user console, if the received disc identification matches any of the disc identification information stored in the other user tables associated with other user identifications, and if the matched other user table indicates owner consent.

12. The system of claim 11, wherein the host server further assigns points to the point account in the user table associated with the user identification.

13. The system of claim 9, wherein the host server is further configured to
    transmit point information including total reward point information to the user console, if the received disc identification does not match any disc identification information stored in any user table.

14. The system of claim 13, wherein the host server records the received disc identification to the disc table.

15. The system of claim 14, wherein the host server assigns points to the sub-account in the disc table and associated with the received disc identification.

16. The system of claim 3, further comprising a plurality of publisher servers accessible by the host server, the publisher servers being configured to manage a plurality of publisher databases, wherein each of the publisher databases includes sub-accounts managed by one of the publisher servers.

17. The system of claim 16, wherein the host server is further configured to
- transmit point information including total reward point information to the user console, if the received disc identification matches any of the disc identification information stored in the user table and associated with the user identification, and
- the publisher server of the publisher database associated with the received disc identification assigns points to the sub-account of the publisher database associated with the received disc identification.

18. The system of claim 16, wherein the host server is further configured to
- transmit point information to the user console indicating that points have been rewarded, if the received disc identification matches any of the disc identification information stored in the other user tables and associated with other user identifications, and if the matched other user table indicates owner consent, and
- the publisher server of the publisher database associated with the received disc identification assigns points to the sub-account of the publisher database associated with the received disc identification.

19. The system of claim 18, wherein the host server assigns points to a point account in the user table and associated with the user identification.

20. The system of claim 16, wherein the host server is further configured to
- transmit point information including total reward point information to the user console, if the received disc identification does not match any of the disc identification information stored in any user table.

21. The system of claim 20, wherein the publisher server of the publisher database associated with the disc storage medium identified by the received disc identification records the received disc identification to the publisher database associated with the disc storage medium identified by the received disc identification.

22. The system of claim 21, wherein the publisher server of the publisher database associated with the received disc identification assigns points to the sub-account of the publisher database associated with the received disc identification.

* * * * *